United States Patent [19]

Silsby

[11] Patent Number: 5,563,621
[45] Date of Patent: Oct. 8, 1996

[54] DISPLAY APPARATUS

[75] Inventor: Alastair P. Silsby, Shoreham, England

[73] Assignee: Black Box Vision Limited, Brighton, England

[21] Appl. No.: 244,140

[22] PCT Filed: Nov. 17, 1992

[86] PCT No.: PCT/GB92/02129

§ 371 Date: Jun. 29, 1994

§ 102(e) Date: Jun. 29, 1994

[87] PCT Pub. No.: WO93/10639

PCT Pub. Date: May 27, 1993

[30]  Foreign Application Priority Data

Nov. 18, 1991 [GB] United Kingdom ............ 9124444

[51] Int. Cl.$^6$ .................................................. G09G 3/36
[52] U.S. Cl. ................................................ 345/43; 345/88
[58] Field of Search ............................ 345/43, 65, 72, 345/87, 88, 152; 359/66, 89, 67, 68

[56]  References Cited

U.S. PATENT DOCUMENTS

| | | | |
|---|---|---|---|
| 4,578,672 | 3/1986 | Oota ................................. | 345/88 |
| 4,642,619 | 2/1987 | Togashi ............................ | 345/152 |
| 4,716,403 | 12/1987 | Morozumi ...................... | 345/88 |
| 4,772,885 | 9/1988 | Uehara at al. .................. | 345/88 |
| 4,828,365 | 5/1989 | Stewart et al. .................. | 359/68 |
| 4,892,391 | 1/1990 | Stewart et al. .................. | 359/68 |

FOREIGN PATENT DOCUMENTS

| | | | |
|---|---|---|---|
| 2-118521 | 5/1990 | Japan ............................. | 345/88 |
| 91/08508 | 6/1991 | WIPO . | |

*Primary Examiner*—Jeffery Brier
*Attorney, Agent, or Firm*—Chilton, Alix & Van Kirk

[57]  ABSTRACT

A display device is made up of a number of opto-emission plates and opposed LCD shutter plates. Opto-emission plate comprises a plurality of square pixels each having square/rectangular, blue, green, red and white phosphor corner elements. The phosphor elements are energised by ultraviolet light to emit blue, green, red and white light, respectively, and display images are produced by selecting a desired one of the sixteen possible colour combinations for each pixel by switching the corresponding shutter elements on or off to allow light from each element to pass through or not.

15 Claims, 7 Drawing Sheets

DISPLAY APPARATUS

DISPLAY APPARATUS

The present invention relates to colour display apparatus, and particularly, though not exclusively, to display apparatus for use in the advertising industry, public information displays and other such applications, including static or animated displays.

Numerous different devices are known which are able to display text, graphics or moving characters. Many of these comprise moving parts which can reduce reliability and increase manufacturing costs. Others comprise cathode-ray tubes which are bulky and require high-voltage power supplies.

As an alternative, display devices are known which comprise pixels having red, green and blue phosphor pixel elements energised by an ultra-violet light source to emit light. Different colours are generated from each pixel by selecting different combinations of the light emitted by these phospor elements. This is done by using liquid crystal shutter elements which are switched on or off to transmit or block the light from the phosphor elements. These display devices have many advantages, but suffer from only being able to generate a limited colour range.

It would be possible to generate a broader colour range by only partially switching the liquid crystal shutters on or off, or by providing a duty cycle to rapidly switch the shutters on or off. Unfortunately however, the effect produced by either of these methods is reduced as the viewing angle is increased, and so both methods effectively narrow the viewing angle of the display device.

The present invention provides a display device including pixels having red, green, blue and white colour pixel elements, and shutter means which may be turned on or off to allow or prevent light from the colour pixel elements to be emitted from the display.

The apparatus may take a number of forms. For example, the colour pixel elements could be filters illuminated by a white light source or by a combination of red, blue and green light sources. Preferably, however, the red, green and blue colour pixel elements comprise red, green and blue phosphors respectively, and the white colour element comprises either white phosphors or a mixture of red, green and blue phosphors, the phosphors being excited by a source of electromagnetic radiation, such as an ultra-violet light source. The shutter means preferably comprises liquid crystal pixels having shutter pixel elements in alignment with the colour pixel elements.

The use of the white colour elements enables a possible sixteen different colour combinations to be produced (having predetermined differences in hue and saturation) by switching the shutter means on or off, and allows the display to have both a broad colour range and wide viewing angle (although, if a large viewing angle is not required then there is no reason why the shutter means could not be turned partially on or off or used with a duty cycle as mentioned above).

Thus, the invention is particularly useful in relation to large display devices such as for advertising purposes, although the invention may also be used in small scale devices.

A further advantage of the invention is that the display device colour set is compatible with standard EGA (extended graphics adaptor) software packages, which are used in the graphics industry and are based on a range of 16 colours. Therefore, the device does not need to have a large amount of software written specifically for it, and may take advantage of the numerous EGA software packages already in existence.

Moreover, four digital bits, which is equal to half a byte, may be used to control the four colour elements of each pixel, and this results in the full utilisation of digital circuitry associated with the display, which is not possible with only three colour elements per pixel. A minimum number of electronic control components may therefore be used, reducing space requirements.

Preferably, the amount of light emitted from the white element is set to such a value that desired colour saturations are achieved when the white element is on at the same time as one or more of the red, green and blue elements.

Typically, the light intensity will be much greater for the white element than for the other three elements. Preferably, therefore, the white element has a smaller surface area than the other elements.

Various factors, such as phosphor efficiency (where these are used), must be taken into account when deciding on the most appropriate surface area ratios.

A further consideration to be taken into account when deciding on a surface area or intensity for the white element is that, in order to provide the full sixteen colour combination, the amount of light emitted from the white element by itself should be different from the amount emitted from the red, green and blue elements combined, as this will produce two shades of "grey" colour, whereas, if the two amounts were equal, then the white element by itself would provide the same "grey" colour as the combination of the red, blue and green elements.

If, for example, it were desired to have the brightness of white light produced by turning on all of the red, green and blue element to be twice the brightness of the white element alone, the area of the white element would be set to substantially ($\frac{1}{2}$)n times the combined area of the other elements or $1.5/n$ times the area of each other element, if the other elements are of the same area as one another, where n is the ratio of the intensity of the white element to that of each other element.

In the preferred phosphor system, the white element will produce light of about three times the intensity of the light of the other three elements, and it has been found that a white element having a surface area of between about one fifth and one half that of the other elements provides a suitable colour range.

The pixel containing the four colour elements may take any suitable shape, with a rectangular or a square pixel being preferred. These shapes give the pixel more efficient surface coverage of the screen, and the square shape allows for an even resolution in both the X and Y co-ordinates.

When using square pixels in the prior art (three colour) displays, it has been found difficult to provide a simple topography for the elements which can provide a good colour spread, and, where the elements have been arranged as three parallel rectangles, parallax problems have arisen.

By using four colour elements in a square pixel, the colour spread within the pixel may be improved by, for example, positioning the elements at respective corners of the pixel. It is then possible to ensure that no identical colour elements of adjacent pixels lie next to one another, thereby providing consistent colour resolution on the screen. This is impossible to achieve using only three colour elements per pixel.

Moreover, the construction of the liquid crystal shutter means, whose pixels will have elements of corresponding shape to the colour elements, may be simplified. This is because the conductive tracks between the various elements may be quite thick and may be made to run in straight lines, whereas in prior art (three element) colour systems, the conductive tracks must be thin and are required to follow tortuous paths to make all the necessary connections.

Indeed, the electrode arrays defining the shutter pixel elements may be formed from a number of continuous conductive strips arranged in rows on one side of the LCD assembly and arranged in columns on the other side of the assembly, the overlap of a row with a column defining the pixel element shape.

Still further, the placing of the colour elements at the corners enables anti-aliasing to be performed, i.e. to treat the screen as if it has a higher resolution than it actually does and to reduce the jagged edge effect in curved or diagonal images, which is not possible with three element pixels.

Preferably, the colour elements themselves are substantially square in shape or as close to square as possible (given the need to accommodate the size difference of the white element to the other elements) as this avoids parallax problems.

Where the white element is to have a smaller surface area than the other elements, the white element and the diagonally opposed element may be square, whilst the remaining two elements may be generally rectangular in shape with the corners of the latter two elements which are adjacent each other being removed so that these two elements have a common boundary line. The inner angles of each of the second pair of elements, resulting from the removed corners, may be about 135°. As the square element opposed to the white element will usually have a slightly smaller surface area than the remaining two elements, it is preferred that this square element be the green colour element as the eye is more sensitive to green light than to red or blue light, and this helps to compensate for the slight inequality in surface area.

In one preferred form, the pixel is about 9 mm×9 mm square, the white element is about 2.32 mm×2.32 mm square, the diagonally opposed element is about 4.85 mm×4.85 mm square, and the remaining two elements substantially take up the remainder of the pixel area. Arrangements having measurements scaled from these values are also preferred arrangements.

Arrays of colour and shutter pixels may be formed on, for example, glass or plastics substrates, and may be bonded to one another to form a display panel. These panels may be connected together in an array to form a screen. Preferably, the panels are arranged to minimise the gaps between each other, by, for example, being overlapping. The panels/screens may be flat, multi-sided, or curved and may range in size from the small to large scale. A typical screen size, comprising, for example, an array of 10×12 panels, may be about 1m×1.5 m.

The elements of each shutter pixel may be controlled by a processor, via line drivers and a display buffer store, to produce the desired images on the screen, and various peripherals such as hard memories and discs for holding screen libraries may be provided.

Where phosphors are used in the colour elements, filters of the appropriate colour may be positioned over them between the colour elements and the shutter means in order to take advantage of the phosphors' ability to reflect natural white light, thereby improving the performance of the display device in daylight. When daylight passes through the shutter means and reflects off of a phosphor element, a filter over the phosphor element allows only reflected light corresponding to the phosphor element's colour to pass back out through the shutter means.

An embodiment of the present invention will now be described, by way of example only, with reference to the accompanying drawings, in which.

Figure 1:
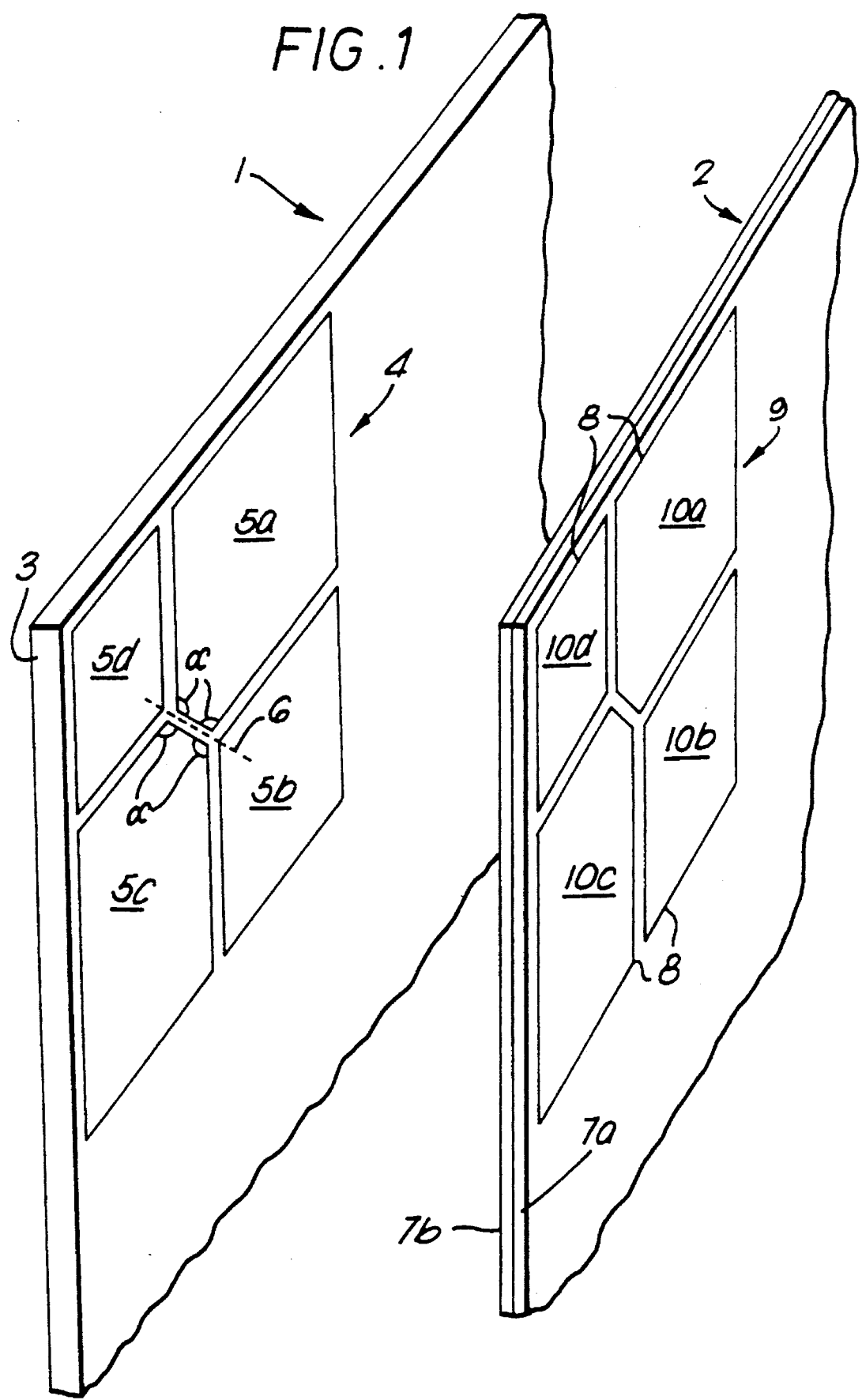
FIG. 1 is a schematic perspective view of an opto-emission plate and a liquid crystal shutter plate.

Referring to FIG. 1, an opto-emission plate 1 and a liquid crystal shutter plate 2 are shown.

The opto-emission plate 1 comprises a glass substrate 3 on which are formed an array of pixels 4 (only one of which is shown). Each pixel 4 consists of four colour elements 5a–5d comprising blue, green, red or white phosphors respectively. The phosphors, which may be high colour rendering triphosphors as known in the art, may be applied to the substrate 3 in a known manner, using, for example, an ultra-violet resistant binder.

The white colour element 5d has a surface area approximately one quarter that of the green element 5b and approximately one fifth that of each of the other elements 5a, 5c, and is formed as a square. The green colour element 5b is also formed as a square, whilst the blue and red elements 5a and 5c are generally rectangular in form and have their corners nearest the centre of the pixel 4 removed, so that they have resulting inner angles α of 135° and share a common boundary line 6.

The shutter plate 2 is also formed in a known manner and comprises a liquid crystal material of, for example, the twisted nematic type, encapsulated between front and rear glass plates 7a and 7b. A matrix of transparent electrodes 8 is provided on the inner surface of front glass plate 7a and a corresponding electrode matrix (not shown) is formed on the inner surface of rear glass plate 7b. The front and rear electrodes 8 define a number of shutter pixels 9 (only one shown), each of which comprises four shutter elements 10a–10d of the same shape and size as the colour elements 5a–5d of the opto-emission plate 1. The liquid crystal assembly is completed by providing polarisers on the front and back faces of the shutter plate 2. These polarisers are aligned in the same plane, so that light will only be transmitted through a shutter plate element 10a–10d by applying a suitable voltage between corresponding front and rear electrodes 8.

To form a display panel 11 (see FIG. 6), the opto-emission plate 1 and shutter plate 2 are bonded together so that the colour elements 5a–5d are in alignment with the correspondingly proportioned shutter elements 10a–10d.

When electromagnetic radiation from, for example, an ultra-violet tube strikes the opto-emission plate 1, the blue, green, red and white phosphors of the colour elements 5a–5d respectively, emit blue, green, red and white light respectively.

Therefore, by applying a suitable voltage to one or more pairs of opposed front and rear matrix electrodes 8, one or more of the shutter elements 10a–10d are turned on, and the light from one or more colour elements 5a–5d is transmitted through the shutter plate 2 to an observer.

As there are four colour elements, it is possible to produce a maximum of sixteen colours, having predetermined differences in hue and saturation, merely by turning the shutter elements 10a–10d on or off. If "BW", for example, is taken to refer to a combination of the blue and white colour elements 5a, 5d, then the sixteen possible colours available are: B, G, R, W, WB, WG, WR, BG, BR, GR, WBG, WBR, WGR, BGR, WBGR, and all elements off (=black).

The light from the white element is approximately three times more intense than the light from the other colour elements. Therefore, by making the surface area of the white element smaller than that of each of the other elements, swamping of the blue, green or red colours by white light in the WB, WG and WR combinations is prevented. Also, the W and BGR combinations produce a light "grey" and a "lighter grey" respectively, rather than producing the same "grey" colour, which would occur if the surface areas of all four elements 5a–5d were equivalent.

Figure 2:
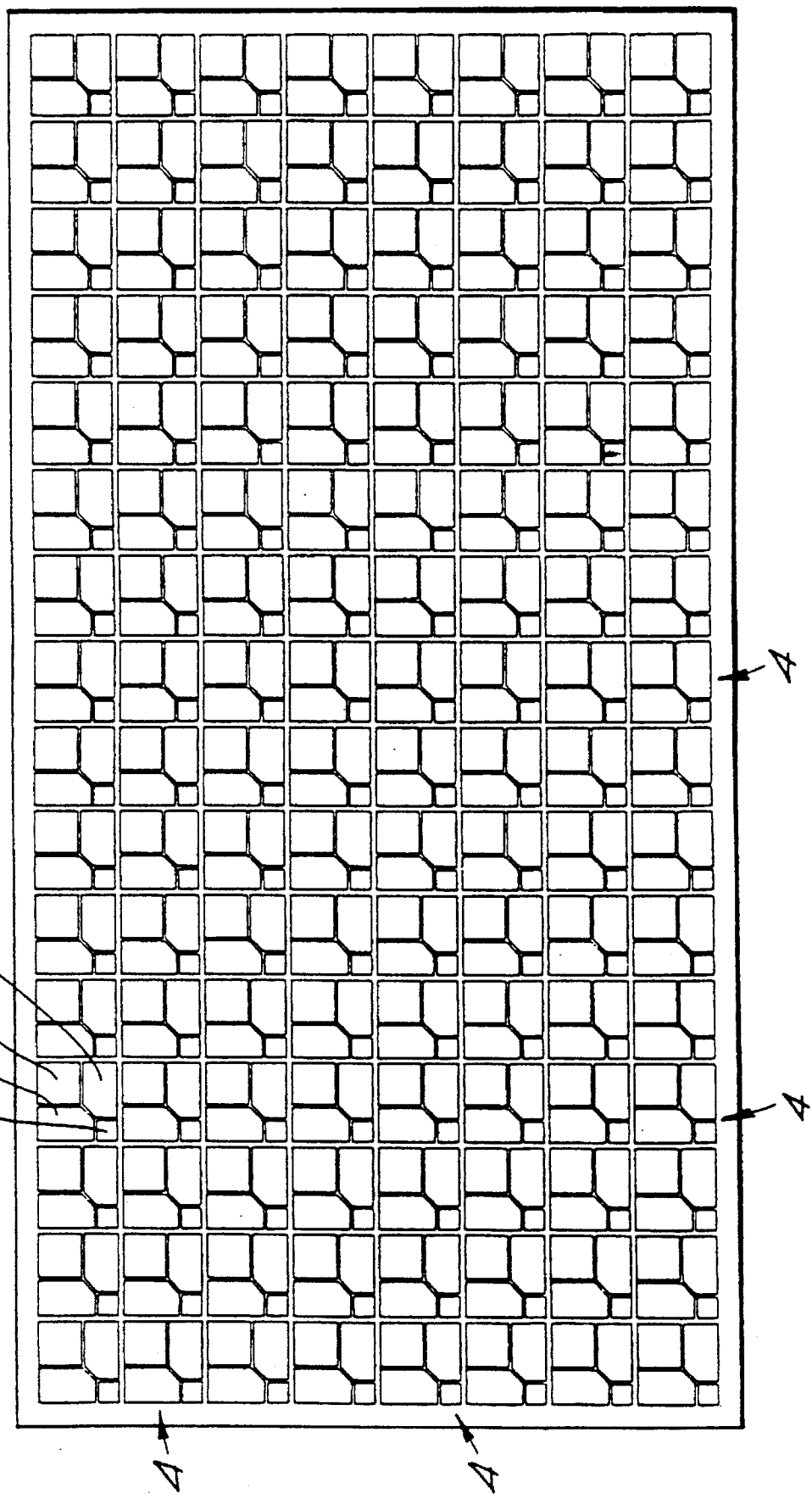
FIG. 2 is a front plan view of the opto-emission plate of FIG. 1.

FIG. 2 shows a front plan view of the optoemission plate 1. The plate 1 comprises a 16×8 array of pixels 4, and the pixels 4 are arranged such that no identical colour elements 5a–5d lie next to one another. This ensures that a consistent resolution appears across the screen. Also, by locating the colour elements 5a–5d in the respective corners of the pixel 4, anti-aliasing routines may be applied to the screen to help remove jagged edges from diagonal or curved images.

Figure 3:
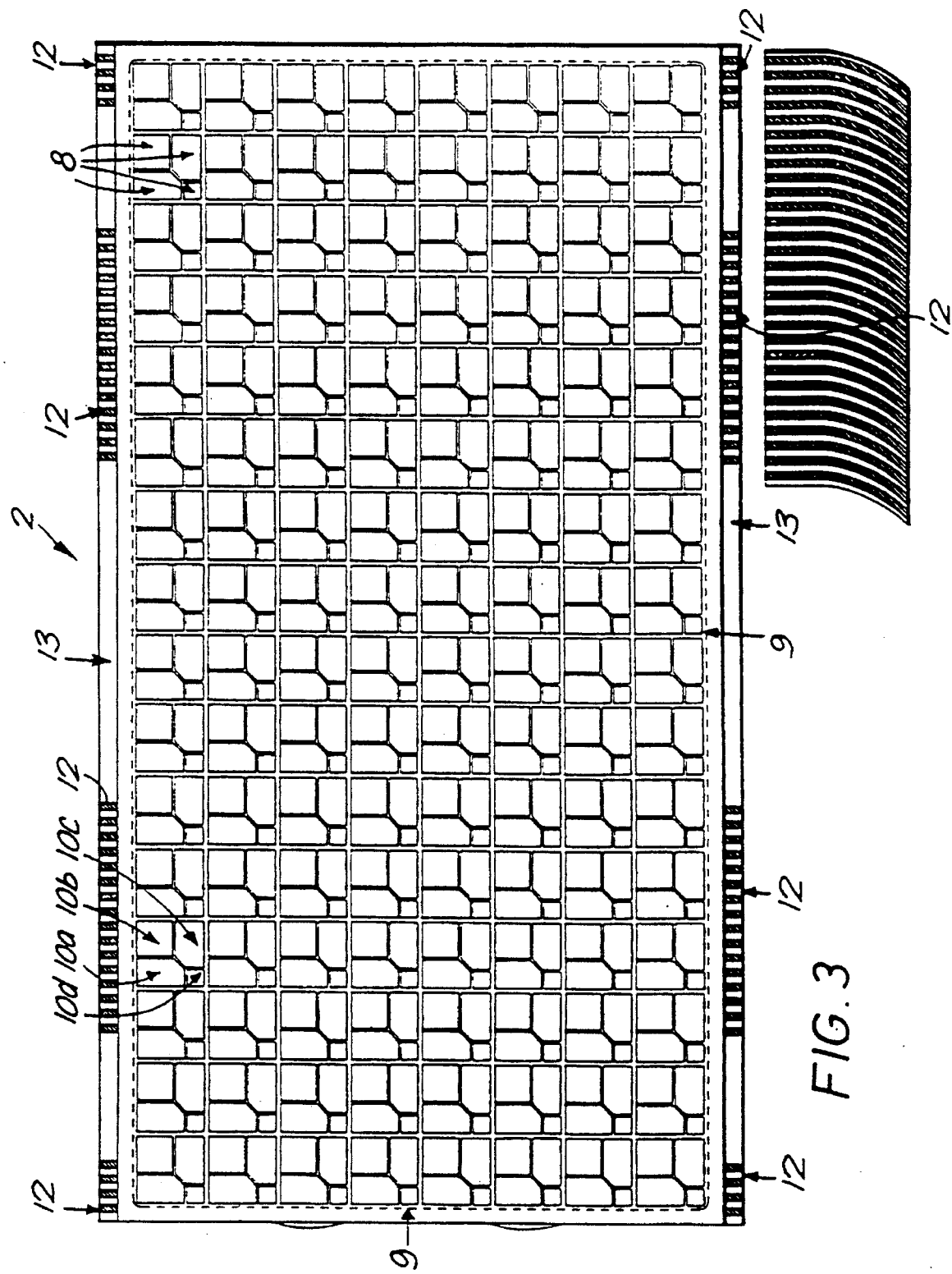
FIG. 3 is a front plan view of the shutter plate of FIG. 1.

Referring to FIG. 3, a front plan view of the shutter plate 2 is shown. Again, the plate 2 comprises a 16×8 array of pixels 9. Connectors 12 are shown for applying suitable voltages to the opposed matrix electrodes 8 defining the pixel shutter elements 10a–10d. The connectors 12 are supported by ledges 13 formed on the back glass plate 7b of the shutter plate 2.

Figure 4:
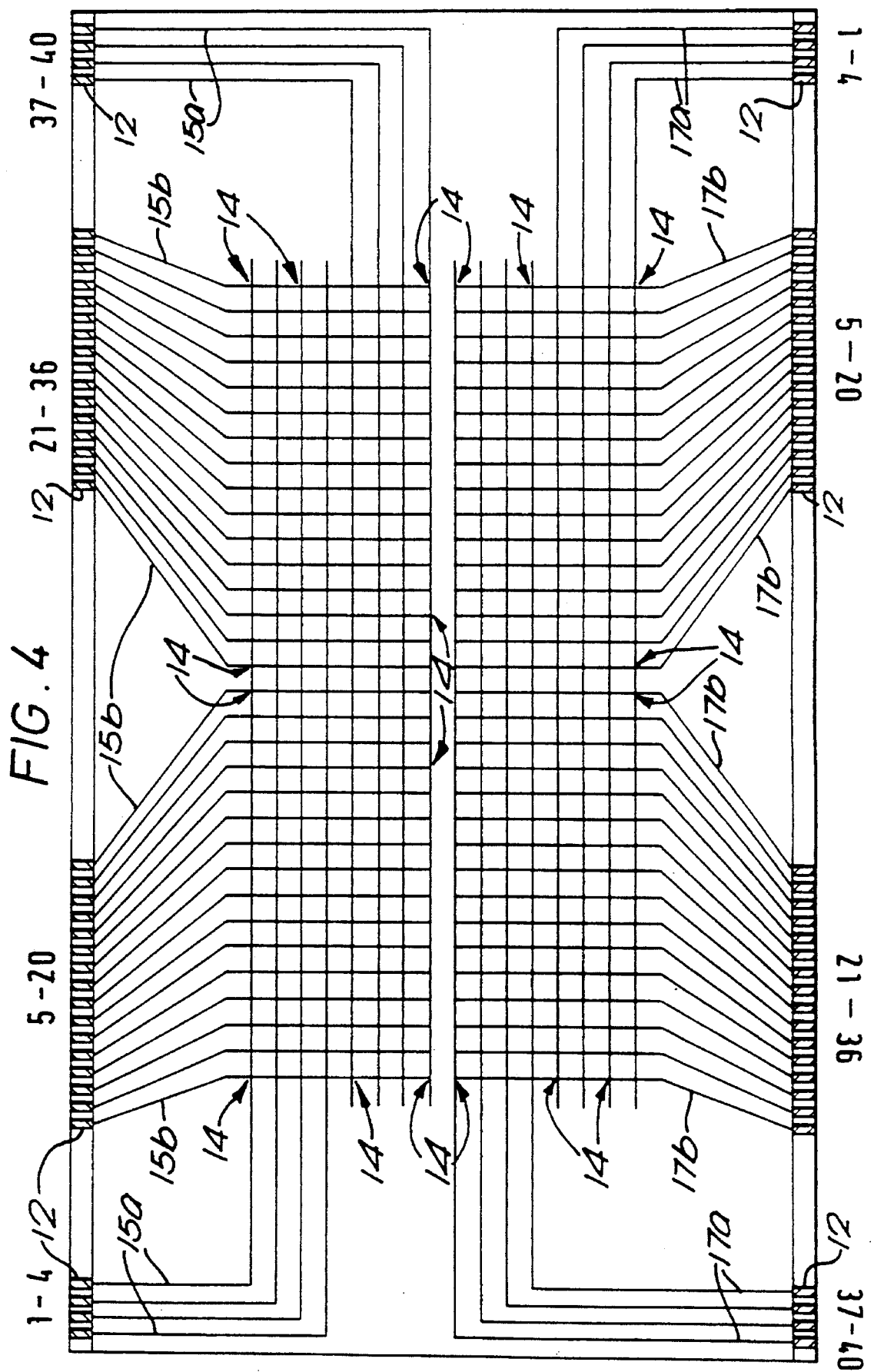
FIG. 4 is a schematic diagram of the multiplexing connections of the electrodes of the shutter plate of FIG. 3.
Figure 5:
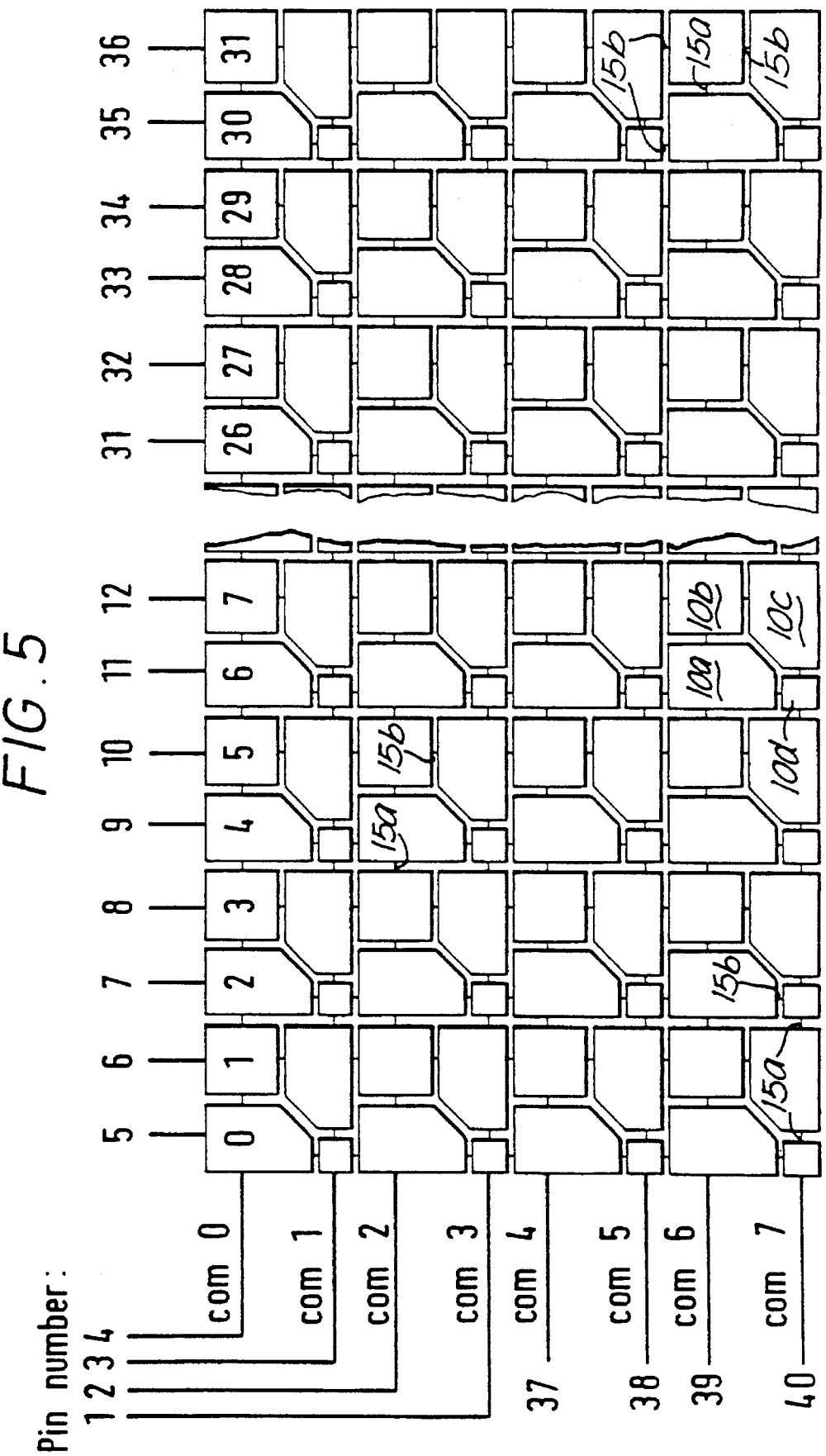
FIG. 5 is a schematic front plan view of a top half of the shutter plate of FIG. 3, showing connections between the electrodes.

A multiplex system, as shown in FIGS. 4 and 5 is used to turn the shutter elements 10a–10d on and off.

FIG. 4 shows the overall multiplexing arrangement of a single shutter plate 2, with the connecting junctions 14 corresponding to pairs of opposed electrodes 8.

Voltages are applied on the tracks 15a, 15b in the top half of the plate 2 through pins 1 to 40 of a line driver device 16a (see FIG. 6) and voltages are applied on the tracks 17a, 17b in the lower half of the plate 2 through pins 1 to 40 of a further line driver 16b (see FIG. 6), so that two drivers 16a, 16b are required for each display panel 11. It will be appreciated that tracks 15a, 17a connect the electrodes in rows on the front array, whilst tracks 15b, 17b connect the electrodes in columns on the rear array.

Referring to FIG. 5, voltages are applied to lines com0 to com7 sequentially in a cyclic manner, and, in order to turn on a specific shutter element 10a–10d, a voltage signal is provided on the appropriate one of PIN lines 5 to 36 at the time in the scan cycle when a voltage is applied to the appropriate com line. The same multiplexing method is used for shutter elements 10a–10d in the lower half of the plate 2.

In practice, the electrodes 8 are set at a constant biasing voltage so that the elements are about one fifth on, as this improves the response time to the control voltages.

As can be seen from FIG. 5, an advantage of the shutter element arrangement is that the conductive tracks 15a, 15b, 17a, 17b between the electrodes 8 are able to be formed as thick straight lines, which facilitates their manufacture and increases their reliability. In contrast, the multiplexing tracks used in three colour pixel arrangements need to be thin and must follow somewhat tortuous paths. Indeed, instead of having tracks 15a, 15b, 17a, 17b, the electrodes may be elided together and formed as continuous conductive strips arranged as rows on the front array and columns on the rear array.

Figure 6:
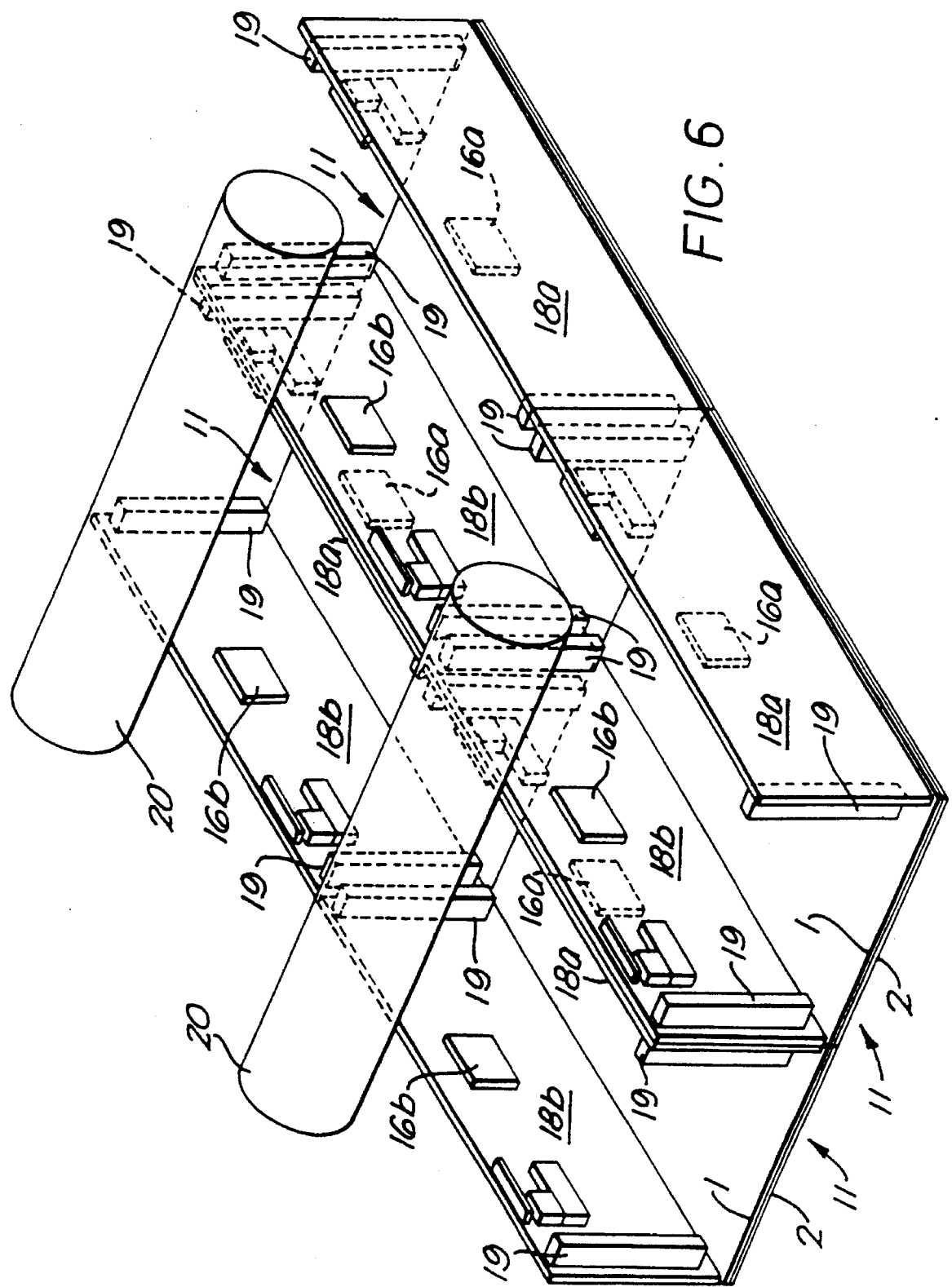
FIG. 6 is a schematic rear perspective view of a portion of a display screen comprising a number of display panels.

FIG. 6 is a back perspective view of four display panels 11 connected together. Associated with each panel 11 are two printed circuit boards 18a–18b on which are mounted the line drivers 16a, 16b, respectively, for controlling the shutter elements 10a–10d. Each PCB 18a, 18b has a connector block 19 at each end for connecting the display panels to one another. A pair of ultra-violet light tubes 20 are provided behind the panels 11 to stimulate the phosphor colour elements 5a–5d to emit light.

A complete screen may typically be made up of 120 display panels 11, in a 10×12 array, to give an approximate screen area of 1.0×1.5 meters.

Figure 7:
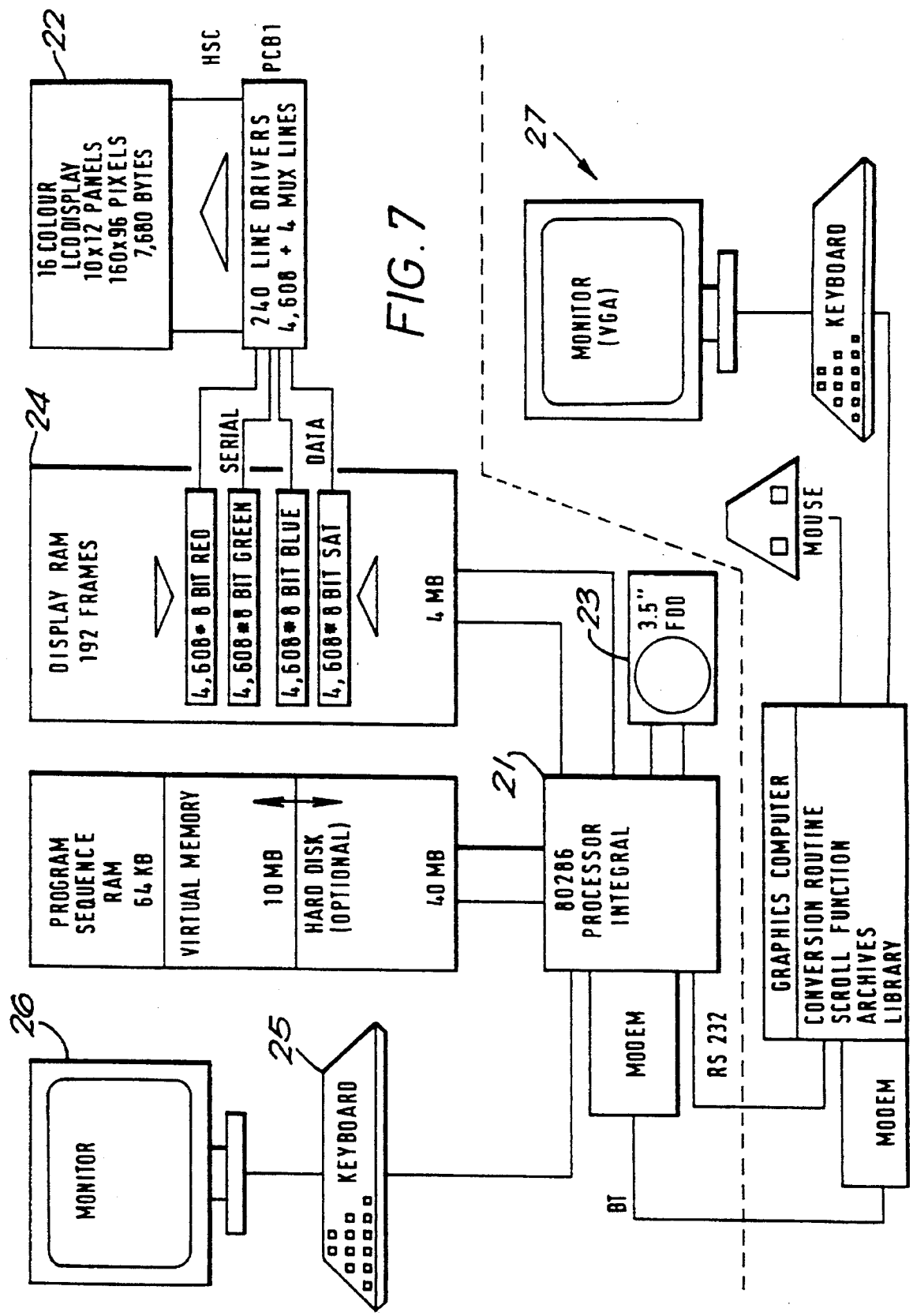
FIG. 7 is a schematic diagram of an overall display system incorporating the display device of the present embodiment.

FIG. 7 shows schematically an overall display system incorporating such a display screen.

A microprocessor 21 controls the display on screen 22 by downloading various screen frames from, for example, a floppy disc drive 23 into a display RAM 24, which, in the present case, holds 192 frames at a time. The microprocessor 21 tracks through these frames to provide animated graphics on the screen. The display RAM 24 holds a map of the screen on a 1 bit to 1 bit correspondence basis and sends the screen information serially to the line drivers 16a, 16b via buffer disc cards (not shown) in a manner known in the art. The RAM 24 has sufficient capacity to control a display of 16×16 panels instead of 12×10, if desired.

A keyboard 25 and monitor 26 are provided to allow control of the screen 22 by a user.

A more sophisticated graphics computer system 27 may be added to the basic system to enable screen displays to be designed more conveniently.

The above description is merely a preferred embodiment of the present invention and various modifications of the arrangement can be envisaged and are within the scope of the present invention.

I claim:

1. A display device including pixels having red, green, blue and white colour pixel elements, and shutter means which may be turned on or off to allow or prevent light from the colour pixel elements to be emitted from the display;

wherein the amount of light emitted from the white element is set to a value such that desired colour saturations are achieved when the white element is on at the same time as one or more of the red, green and blue elements;

wherein the colour pixel elements include phosphors activated to emit light by a source of electromagnetic radiation; and wherein the white element has a smaller surface area than the other colour pixel elements.

2. A display device including pixels having red, green, blue and white colour pixel elements, and shutter means which may be turned on or off to allow or prevent light from the colour pixel elements to be emitted from the display;

wherein the amount of light emitted from the white element is set to a value such that desired colour saturations are achieved when the white element is on at the same time as one or more of the red, green and blue elements;

wherein the colour pixel elements include phosphors activated to emit light by a source of electromagnetic radiation; and wherein the amount of light emitted by the white element is approximately one half the amount emitted by the red, green and blue elements combined, and wherein the area of the white element is set to substantially $(\frac{1}{2})n$ times the combined area of the other three color pixel elements, where n is the ratio of the intensity of the white element to that of each other colour pixel element.

3. A display device including pixels having red, green, blue and white colour pixel elements, and shutter means which may be turned on or off to allow or prevent light from the colour pixel elements to be emitted from the display;

wherein the amount of light emitted from the white element is set to a value such that desired colour saturations are achieved when the white element is on at the same time as one or more of the red, green and blue elements;

wherein the colour pixel elements include phosphors activated to emit light by a source of electromagnetic radiation; and wherein the white element produces light of about three times the intensity of the light of the other three elements, and has a surface area of between about one fifth and one half that of each of the other colour pixel elements.

4. A display device according to claim 1; wherein each pixel containing the four colour pixel elements is rectangular or square in shape.

5. A display device according to claim 4, wherein the colour pixel elements of each pixel are provided at respective corners of the pixel.

6. A display device according to claim 5, wherein the colour pixel elements are substantially square or rectangular in shape.

7. A display device including pixels having red, green, blue and white colour pixel elements, and shutter means which may be turned on or off to allow or prevent light from the colour pixel elements to be emitted from the display;

wherein the amount of light emitted from the white element is set to a value such that desired colour saturations are achieved when the white element is on at the same time as one or more of the red, green and blue elements;

wherein the colour pixel elements include phosphors activated to emit light by a source of electromagnetic radiation; and wherein the white element and the colour pixel element diagonally opposed to it are square, and the remaining two colour pixel elements are generally rectangular in shape with adjacent corners of the said remaining two colour pixel elements being removed so that the said two remaining colour pixel elements have a common boundary line.

8. A display device according to claim 7, wherein the inner angles of each of the remaining two colour pixel elements, resulting from the removed corners, is about 135°.

9. A display device including pixels having red, green, blue and white colour pixel elements, and shutter means which may be turned on or off to allow or prevent light from the colour pixel elements to be emitted from the display;

wherein the amount of light emitted from the white element is set to a value such that desired colour saturations are achieved when the white element is on at the same time as one or more of the red, green and blue elements;

wherein the colour pixel elements include phosphors activated to emit light by a source of electromagnetic radiation;

wherein the white element and the colour pixel element diagonally opposed to it are square, and the remaining two colour pixel elements are generally rectangular in shape with adjacent corners of the said remaining two colour pixel elements being removed so that the said two remaining colour pixel elements have a common boundary line; and wherein the green element is said diagonally opposed square colour pixel element.

10. A display device including pixels having red, green, blue and white colour pixel elements, and shutter means which may be turned on or off to allow or prevent light from the colour pixel elements to be emitted from the display;

wherein the amount of light emitted from the white element is set to a value such that desired colour saturations are achieved when the white element is on at the same time as one or more of the red, green and blue elements;

wherein the colour pixel elements include phosphors activated to emit light by a source of electromagnetic radiation; and wherein the pixel and colour pixel elements have sizes as follows or scaled therefrom: the pixel is about 9 mm by 9 mm, the white element is about 2.32 mm by 2.32 mm, the diagonally opposed element is about 4.85 mm by 4.85 mm, and the remaining two elements substantially take up the remainder of the pixel area.

11. A display device according to claim 5, wherein the shutter means comprises liquid crystal pixels having shutter pixel elements in alignment with the colour pixel elements.

12. A display device according to claim 11, wherein the conductive tracks between the shutter pixel elements run in straight lines.

13. A display device according to claim 11, wherein electrode arrays defining the shutter pixel elements are formed from a number of continuous conductive strips arranged in rows on one side of the LDC assembly and arranged in columns on the other side of the assembly, the overlap of a row with a column defining a shutter pixel element.

14. A display device including pixels having red, green, blue and white colour pixel elements, and shutter means which may be turned on or off to allow or prevent light from the colour pixel elements to be emitted from the display, wherein the white element has a smaller surface area than the other colour pixel elements.

15. A display device including pixels having red, green, blue and white colour pixel elements, and shutter means which may be turned on or off to allow or prevent light from the colour pixel elements to be emitted from the display, wherein the white element produces light of about three times the intensity of the light of the other three elements, and has a surface area of between about one fifth and one half that of each of the other colour pixel elements.

* * * * *